United States Patent [19]

Grundtisch

[11] Patent Number: 4,723,271
[45] Date of Patent: Feb. 2, 1988

[54] APPARATUS FOR SELECTIVELY ALERTING PARTY LINE SUBSCRIBERS

[75] Inventor: Mark R. Grundtisch, Rochester, N.Y.

[73] Assignee: TII Computer Systems, Inc., Copiague, N.Y.

[21] Appl. No.: 787,286

[22] Filed: Oct. 15, 1985

[51] Int. Cl.⁴ .......................................... H04M 13/00
[52] U.S. Cl. ................................. 379/181; 379/179; 379/177
[58] Field of Search ................ 179/17 E, 17 A, 17 R, 179/27 E, 28, 84 R, 84 SS, 86, 84 A; 379/177, 179, 180, 181; 340/825.43

[56] References Cited

U.S. PATENT DOCUMENTS

| 1202740 | 4/1986 | Canada | 379/179 |
| 4,056,694 | 11/1977 | Brolin | 179/84 R |
| 4,587,380 | 5/1986 | Curtin | 179/17 A |

Primary Examiner—Jerry W. Myracle
Assistant Examiner—Lawrence G. Fess
Attorney, Agent, or Firm—Pennie & Edmonds

[57] ABSTRACT

An apparatus is described having the capability to selectively alert subscribers in a telephone party line system where different subscriber parties are alerted using different ringing configurations. Subscribers are identified as being a member of a party by the connection pattern used to interface the apparatus to the telephone party line. The apparatus comprises means for detecting whether a ringer signal received from the telephone line is meant to alert a given subscriber party, and means for coupling the ringer signal to subscriber alerting equipment when an appropriate ringer signal is detected.

17 Claims, 5 Drawing Figures

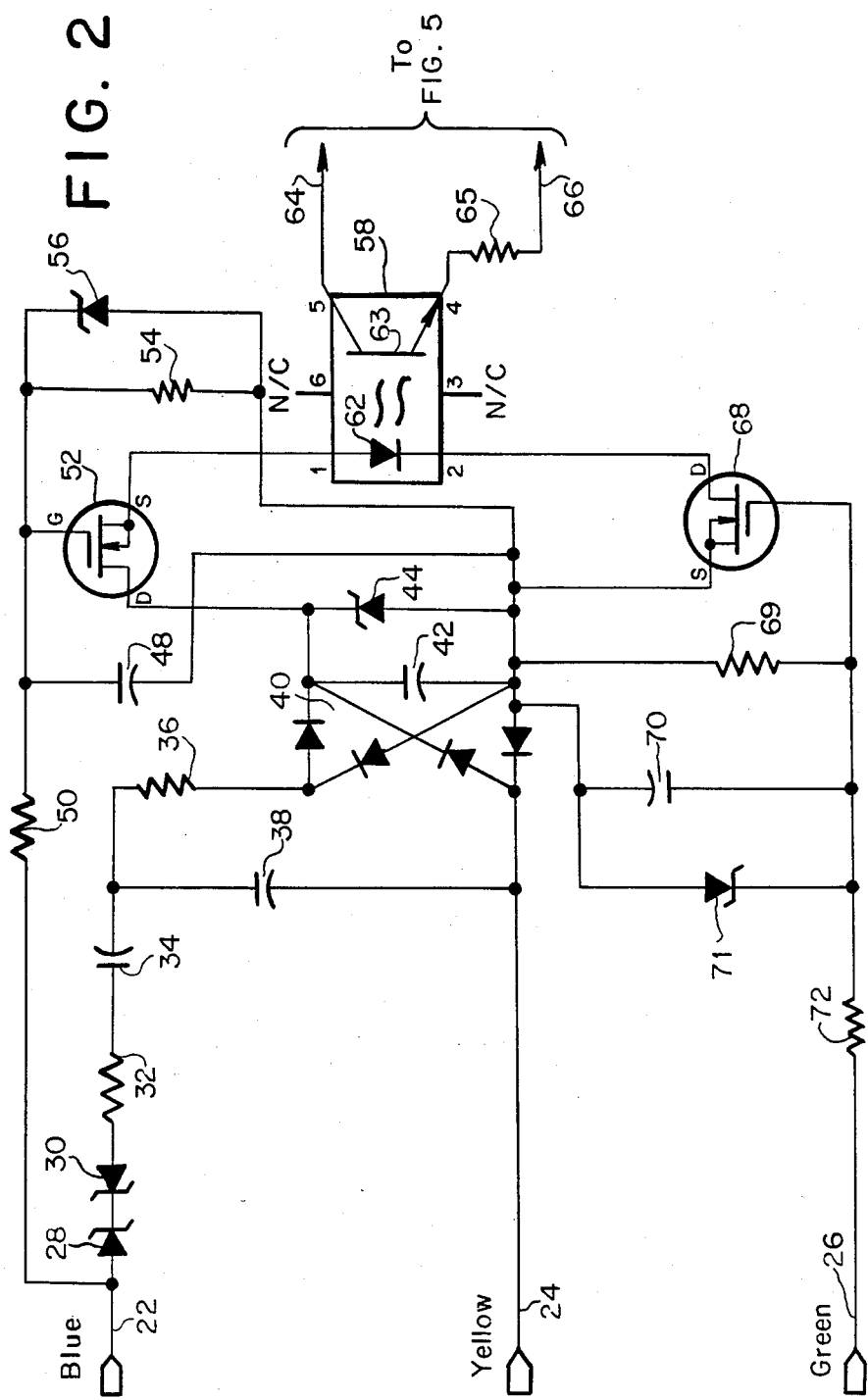

FIG. 4

Ringer Signal Configuration

| Party # | TIP | Ring |
|---|---|---|
| 1 | −36 VDC 86 +/−2VRMS 20 +/−3Hz | GRD |
| 2 | — | +36 VDC 86 +/−2VRMS 20 +/−3Hz |
| 3 | +36 VDC 86 +/−2VRMS 20 +/−3Hz | — |
| 4 | GRD | −36 VDC 86 +/−2VRMS 20 +/−3Hz |

FIG. 3

Connection Pattern

| Party # | TIP | Ring | GND |
|---|---|---|---|
| 1 | Line 24 | Line 22 | Line 26 |
| 2 | — | Lines 22&26 | Line 24 |
| 3 | Lines 22&26 | — | Line 24 |
| 4 | Line 22 | Line 24 | Line 26 |

APPARATUS FOR SELECTIVELY ALERTING PARTY LINE SUBSCRIBERS

BACKGROUND OF THE INVENTION

Party lines provide a means of servicing a plurality of subscribers using only a single communication line wire pair known as a "subscriber loop" originating at the Central Office (C.O) or a PBX.

The telecommunication system as well as those persons using it regard each subscriber as a separate entity. Thus, it is desirable to have the capability to notify one subscriber that it is receiving an incoming call without simultaneously and falsely alerting the other subscribers.

A party line subscriber alerting system is characterized by its capability to perform full-selective, semi-selective and coded ringing alerting functions.

A system performs full-selective alerting when each subscriber associated with the party line is alerted only when he receives an incoming call over that line. In semi-selective alerting, the subscribers associated with a party line are divided into groups of two and both subscribers of a group are alerted whenever any one of them receives an incoming call. Finally, coded ringing is performed by using a different number of rings of a different type ringer signal to alert each subscriber, or alternatively, each group of subscribers.

A variety of methods may be used to implement party line ringing. The most common scheme used to selectively alert a party line subscriber employs a DC biasing voltage in conjunction with grounded wiring of the alerting mechanism and superimposes a 20 Hz signal upon this potential. *Telecommunications Transmission Engineering*, Vol. 2, (Winston-Salem, Western Electric Inc. Tech. Public. 1977). Another selective alerting scheme uses a different frequency ringer signal generated by the C.O. to alert each party of subscribers. This method is not commonly in use.

The simplest of the methods using DC biased and superimposed AC signaling is known as divided code ringing. This method involves the application of a ringer signal having a −48 V DC component and a 20 Hz AC component to either the TIP line or the RING line of a telephone line wire pair. This method is capable of performing two-party full selective ringing with only one party being alerted by a ringer signal on TIP and only the other being alerted by a ringer signal on RING. It also supports four party semi-selective ringing, and coded ringing for more than four parties.

A more sophisticated method known as superimposed ringing uses a ringer signal having either a positive or negative polarity 36 to 40 V DC component applied to either the TIP or RING wire of a party line. Systems utilizing this alerting method are thus capable of four-party full selective and eight party semi-selective ringing, and use coded ringing selectively to alert more than eight parties.

A system employing either method references signals provided by the Central Office or PBX over the TIP and RING lines of the communication line wire pair to a ground potential, which is ordinarily provided over the sheath of said wire pair.

SUMMARY OF THE INVENTION

In accordance with the present invention an apparatus is described which is useful for selectively alerting subscribers and for providing a simple means for readily interfacing subscriber equipment to a party line communication system.

In the presently preferred embodiment, each party of subscribers is connected to the telephone line by the apparatus such that a ringer singal will be coupled to each subscriber of a party only when that ringer signal is appropriate for alerting that party. More particularly, the connection pattern used ot couple signals from the TIP and RING wires and a ground potential to the apparatus determines the type of ringer signal to which the apparatus will be responsive.

The apparatus comprises a DC bias detection means for detecting whether the ringer signal contains the proper bias, and AC signal detection means for determining whether the ringer signal includes an AC component of a predetermined voltage and frequency, an incoming line coupled to either the TIP or RING wires, an outgoing line coupled to a subscriber's alerting mechanism and a switch means for coupling the incoming line to the outgoing line when the appropriate signal is detected.

The apparatus is particularly adapted for use in a party line system wherein subscribers are selectively alerted using ringing signals having different DC voltage components which are applied to either the TIP or RING wire of a telephone line. In such systems, a party of subscribers is to be alerted only when a ringer signal having a particular DC voltage component is applied to the appropriate wire (TIP or RING) of the telephone line.

BRIEF DESCRIPTION OF THE DRAWINGS

These and other objects, features and advantages of the invention will be more readily apparent from the following detailed description in which:

FIG. 2 depicts an illustrative embodiment of ringer detection circuitry of the present invention;

FIG. 3 illustrates connection patterns used to connect different subscriber station sets to the party line system so that they detect different ringing signals;

FIG. 4 depicts the ringer signal configuration typically used to alert subscribers in a party line system.

DETAILED DESCRIPTION OF THE PREFERRED EMBODIMENTS

Figure 1:
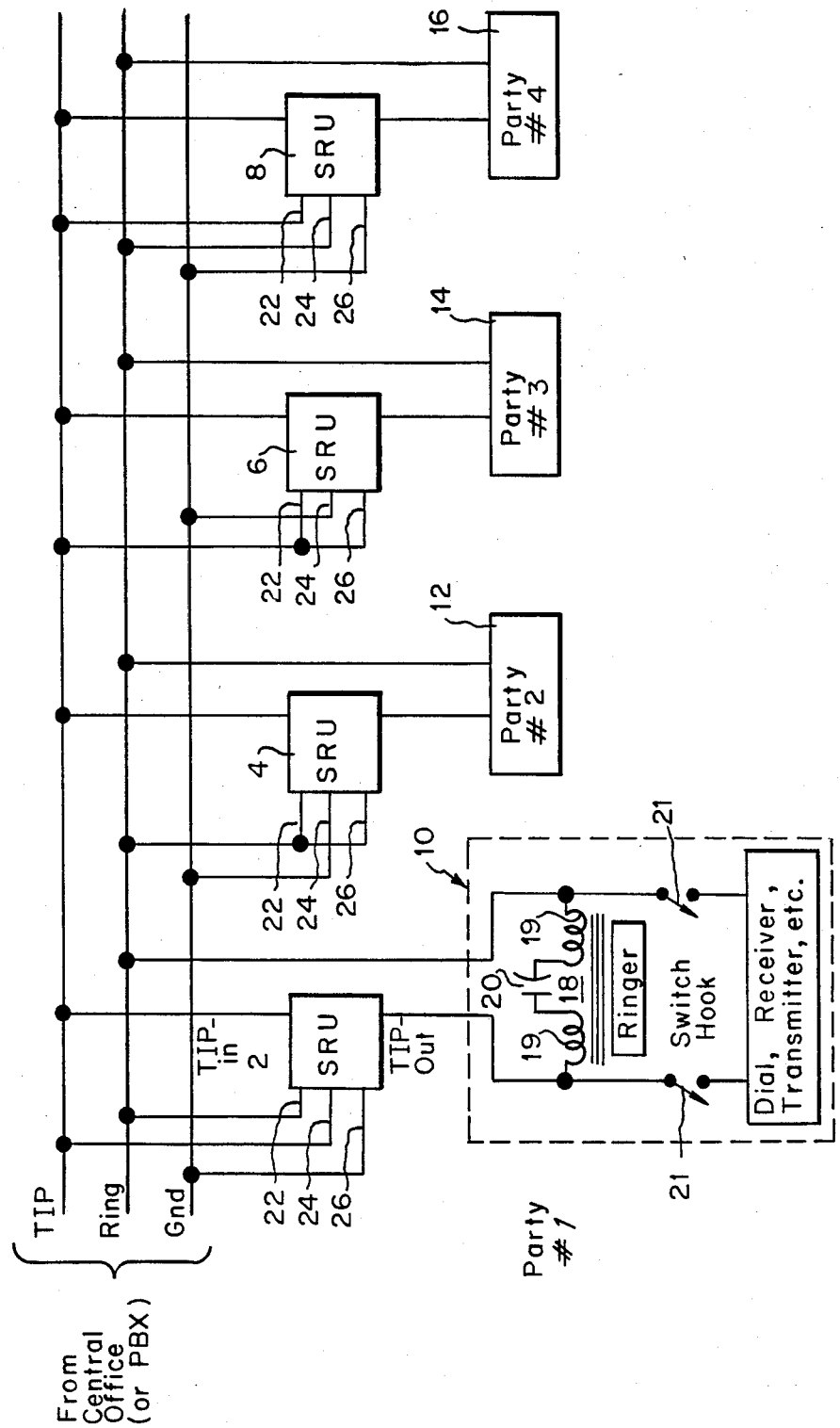
FIG. 1 depicts the connection of a party line system to subscriber stations sets using selective ringing units of the present invention.

FIG. 1 shows selective ringing units 2, 4, 6, 8 (SRU) interfaced with a subscriber party line loop and subscriber station sets 10, 12, 14, 16. A subscriber loop ordinarily includes a TIP wire and a RING wire, and provides a nominal ground potential over the sheath of the loop. At subscriber sites, the ground potential is referenced using a third wire known as the ground (GND) wire.

Each party (or group of parties) to be selectively alerted must be interfaced to a separate SRU. The SRU will alert the party or parties interfaced to it if and only if an appropriate ringer signal is received from the Central Office (C.O.) or PBX. As is described in greater detail below, the specific connection pattern employed to couple an SRU to the subscriber loop determines the type of ringer signal which the SRU will be responsive to. When an SRU receives a ringer signal to which it has been configured to respond, it provides an AC coupling between the TIP-in line, which is an incoming line connected to the TIP wire of a telephone line, and the TIP-out line, which is an outgoing line coupled to the subscriber alerting mechanism. This permits the alerting mechanism of the subscriber's set to receive the ringer signal and be energized thereby.

As shown in FIG. 1, with reference to PARTY #1, a typical alerting mechanism 18 comprises ringer coils 19 and a capacitor 20 connected in series, between the TIP (TIP-out) and RING lines of a subscriber loop. When the appropriate ringer signal is provided to the SRU, the unit provides an AC coupling between TIP-in and TIP-out and thereby enables the ringing signal to pass through and energize the ringer coil. The capacitor blocks any DC current on the loop from passing between TIP and RING.

A switch hook 21 is normally open, as shown, and closes when the subscriber initiates a call or responds to ringer signaling. In the typical type of subscriber station set, this occurs when the subscriber lifts the receiver from the cradle (not shown). When the switch closes, a closed DC circuit exists between the C.O. and the station set. This is detected by the C.O. and a dial tone is then applied to the loop.

The present invention is compatible with telephone communication systems which use ringing signals having both AC and DC components. In particular, the preferred embodiment of the invention can be used with systems using standard divided code ringing, in which the ringer signal has an AC component of 86+/−2 VRMS at 20+/−3 Hz and a DC component of −42.75 to −52.5 volts, as well as standard superimposed ringing, in which the ringer signal has the same AC component as that described immediately above, but has a DC component of either −36 to −40 volts or +36 to +40 volts.

When using the divided code ringing scheme, a party is alerted by selectively applying the ringer signal to either the TIP or RING line of the subscriber loop. Parties are selectively alerted under the superimposed ringing scheme by applying ringer signals having positive or negative polarity to either the TIP or RING line. Divided code ringing, therefore supports a maximum of two party full selective ringing, while superimposed ringing permits up to four party full selective ringing.

The SRU comprise a ringer detection circuit and a communication line switch element. In the presently preferred embodiment, a ringer detection circuit depicted in FIG. 2 tests ringer signals received from a Central Office or PBX in order to determine whether the particular party or parties associated with the SRU are to be alerted. The ringer detection circuit tests both for a correct DC bias and for a correct AC component ringer in a signal. A TIP-switch circuit, shown in FIG. 5 couples TIP-in to TIP-out so that the appropriate ringer signal will energize the subscriber alerting mechanism and enable a subscriber to communicate using the wire pair.

The ringer detection circuit of FIG. 2 comprises lines 22, 24 and 26, zener diodes 28, 30, resistors 32, 36, capacitors 34, 38, diode bridge 40, capacitor 42, zener diode 44, FETs 52, 68, resistors 50, 72, capacitors 48, 70, resistors 54, 69, zener diodes 56, 71, and optoisolator 58, including light emitting diode (LED) 62 and photodetector 63, lines 64, 66, and resistor 65.

Lines 22, 24, and 26 interface the SRU to the subscriber loop for receiving ringer signals and a ground potential from a Central Office or PBX. Zener diodes 28, 30, resistors 32, 36 and capacitors 34, 38 constitute a filter to detect the 20+/−3 Hz AC component of the ringer signal. If the appropriate AC component is detected, capacitor 42 is charged by diode bridge 40 to a potential sufficient to energize LED 62.

The DC voltage magnitude and polarity of the ringer signal are detected by the voltage across capacitor 48 and capacitor 70. When the ringer signal received has the proper DC voltage component and a polarity such that line 24 is negative with respect to lines 22 and 26, the voltages across said capacitors will turn on FETs 52 and 68, respectively.

Zener diodes 28, 30 are 15 volt zeners. Resistors 32, 36 are illustratively 39K Ohms and 7.5K Ohms, respectively; capacitors 34, 38, are 250 volt, 0.22 microFarad and 100 volt 1.0 microfarad devices, respectively. Diode bridge 40 is illustratively constructed using four diodes and charges capacitor 42 which is a 47 microFarad device. Zener diode 44 limits the potential across capacitor 42 to about 6 volts. FETs 52, 68 are IT1750-type devices which selectively permit current to pass through the LED 62 of optoisolator 58 whenever the appropriate ringer signal has been detected. The LED is energized by the potential stored in capacitor 40, and causes photodetector 63 in optoisolator 58 to drop in resistance and conduct, thus coupling line 64 to resistor 65 and line 66. Resistors 50, 72 are preferably 5.6 megOhms each and resistors 54, 69 are 1 megOhm each. Capacitors 48, 70 are 0.22 microFarad each. Zener diodes 56, 71 are 6 volt devices.

Lines 22, 24 and 26 are connected to the TIP, RING and GND wires. The SRU will be responsive to different polarity ringing signals coupled to either TIP or RING depending upon the connection pattern used when coupling lines 22, 24 and 26 to the TIP, RING and GND wires.

LED 62 of optoisolator 58 will be energized only when line 24 is DC biased negatively with respect to both lines 22 and 26 and an appropriate ringer signal is coupled to either line 24 or line 22. If line 24 is not biased negatively with respect to lines 22, 26, then either FET 52 or FET 68 or both will not be switched into a conductive state and no current will pass through the LED 62 of optoisolator 58. Unless a ringer signal is coupled to either line 24 or line 22, capacitor 42 will not be charged sufficiently to energize the LED.

Up to four parties can be alerted in a full selective manner. FIG. 3 shows the connection pattern for the preferred embodiment of the invention and FIG. 4 illustrates the manner in which AC and DC signals are applied to the TIP and RING wires in order to selectively alert each party.

To illustrate the operation of the ringer detection circuitry shown in FIG. 2, the operation of said circuitry with respect PARTY #1 will be considered. The SRUs for all subscribers to be alerted as PARTY #1 are interfaced to the subscriber loop, in accordance with FIG. 3, by coupling line 24 to the TIP wire, line 22 to the RING wire and line 26 to the GND wire. When a ringer signal having an AC component of 86+/−2 VRMS and a DC component of at least −36 VDC is applied to the TIP line by a Central Office or PBX, only those SRUs which are connected as Party #1 will permit their associated subscriber sets to receive the alerting signal. In every SRU so configured, the LED in optoisolator 58 will be energized and will cause the TIP-switch circuitry shown in FIG. 5 to couple together TIP-in and TIP-out, thereby providing a current path for said ringer signal to the alerting mechanism of each such subscriber set.

More particularly, when line 24 is so biased and a ringer signal is received via said line, the AC component of the ringer signal charges capacitor 42 via diode bridge 40. Capacitors 48, 70 are charged more slowly, as determined by the 1.2 second time constant of capacitor 48 and resistor 50 and capacitor 70 and resistor 72, respectively, by the DC component of the ringer signal. When both capacitors 48, 70 are charged, FETs 52 and 68 are switched into a conductive state. Since capacitor 42 has been charged by the ringer signal, current passes through the FETs, and LED 62 of optoisolator 58 is energized.

Given that the SRUs for each party are connected to the TIP, RING, and GND wires of a telephone line in accordance with the connection pattern shown in FIG. 3 and that the appropriate AC and DC signals are selectively applied to said wires in the manner specified in FIG. 4, it will be apparent to one skilled in the art that only the SRU or SRUs of one Party will have its LED element energized at any time. As shown in FIG. 3, when Party #1 is to be selectively alerted, a ringer signal with negative DC polarity is applied to TIP; and line 24 is negatively biased with respect to lines 22, 26. Party #2 will not be alerted because lines 22, 24 and 26 are grounded. Similarly, Party #3 will not be alerted because, for that SRU, lines 22, 26 are coupled to TIP and are biased negatively with respect to line 24. Finally, the LED associated with Party #4 cannot emit light because line 22 is coupled to the TIP wire and it will be biased negatively with respect to line 24.

When Party #2 is to be alerted, an AC signal is applied to RING; and RING is positively biased at least 36 VDC with respect to GND as specified in FIG. 4. Since line 22 receives the ringer signal, capacitor 42 is charged to energize the LED. Since line 26 is also positively biased by the ringer signal while line 24 is grounded, current flows through the LED associated with the SRU for Party #2 and that Party is alerted. However, Party #1 is not alerted because lines 22 and 26 are not both biased positively with respect to line 24. The SRU for Party #3 does not receive the ringer signal at all since no line is coupled to RING; and the SRU for Party #4 does not receive the correct bias signals because line 24 is biased positive.

From the foregoing, the analysis for selective alerting of Parties #3 and #4 will be apparent.

The above description refers to a four-party superimposed ringing scheme. For two-party full selective code ringing, only Party #1 and Party #4 would be utilized. Party #1 is alerted by coupling 48 VDC together with a ringer signal to the TIP wire, and Party #4 is selected by coupling −48 VDC to the RING wire.

It will be apparent to one skilled in the art that Party #2 and Party #3 can similarly be selectively alerted.

Figure 5:
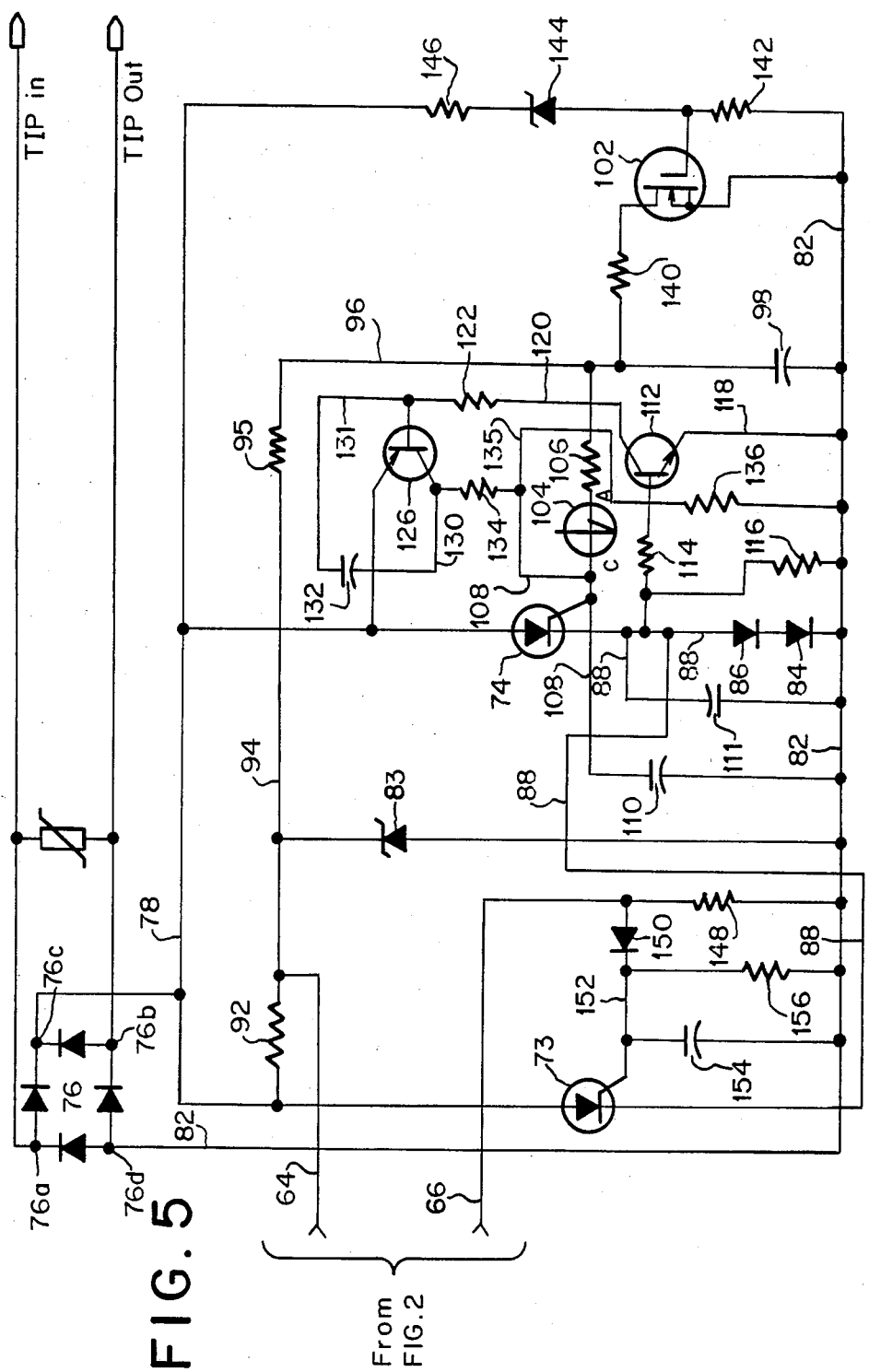
FIG. 5 depicts tip-switch circuitry for selectively coupling the TIP wire of a telephone line to subscriber equipment.

FIG. 5 depicts the TIP-switch circuitry of the SRU. This circuitry functions to cause closure between TIP-in and TIP-out under certain conditions. Since TIP-in is coupled to the TIP lead of a telephone wire pair and TIP-out is coupled to the TIP lead of a subscriber set, only when there is closure between TIP-in and TIP-out can the subscriber set alerting mechanism be energized or can voice or other communications activity take place between the subscriber and the Central Office or PBX system.

As described above, ringer detection circuit of the SRU determines whether a ringer signal is meant for the subscriber associated with that SRU, and in that event, LED 62 of optoisolator 58 is energized. The other occasion when closure between TIP-in and TIP-out is appropriate is when the subscriber goes "off-hook." An off-hook condition indicates that the subscriber either wishes to initiate communication or is responding to an alerting signal.

The TIP-switch circuit shown in FIG. 5, includes two silicon controlled rectifiers (SCRs) 73, 74. Each SCR, preferably S2060D components, will cause closure between TIP-in and TIP-out when triggered. As will be described in greater detail below, SCR 73 is triggered when the ringer detection circuit of FIG. 2 determines that the subscriber(s) associated with that SRU is to be alerted; and SCR 74 fires when a subscriber goes "off-hook" as well as when the appropriate ringer signal is detected.

Full-wave rectifying means 76, preferably comprises four IN93 diodes and terminals 76a, 76b, 76c, 76d. Terminals 76a and 76b are coupled to TIP-in and TIP-out, respectively. The remaining circuitry of FIG. 5 is coupled by lines 78, 82 between terminals 76c, 76d of rectifying means 76. In particular, SCRs 73, 74 are connected in parallel and the series combination of these SCRs and diodes 84, 86 is connected between lines 78, 82. In addition, an SCR control circuit comprising transistors 112, 126, silicon activated switch 104 and associated capacitors and resistors is connected between lines 78 and 82 as well as an RC circuit comprising resistors 92, 95, capacitor 98 and capacitor discharge FET 102.

While a telephone line is not in use, the Central Office or PBX ordinarily couples a potential, usually 48 volts, between the TIP and RING wires of the wire pair. When a subscriber goes "off-hook" to initiate a call, TIP and RING are coupled together by the subscriber's equipment to signal the C.O. or PBX to provide dial tone to the line. Since the TIP-switch circuitry is interposed between the subscriber's equipment and the C.O., it is necessary for the circuitry to determine when the subscriber goes "off-hook" and to then couple TIP-in to TIP-out so that the C.O. can detect the off-hook condition.

When the subscriber goes off-hook, 48 VDC will be applied across the positive and negative outputs of rectifying means 76. Because lines 78 and 82 couple DC potential across SCR 74 and diodes 86, 84, approximately 48 VDC less the diode voltage drops will exist across SCR 74. At the same time, capacitor 98 is being charged through resistors 92, 95. After capacitor 98 reaches approximately eight volts, it causes silicon activated switch 104 to pulse and trigger SCR 74 to close, thereby coupling TIP-in to TIP-out. Current flow between TIP and RING can then be detected by the C.O. and communication activity can take place.

When SCR 74 closes, capacitor 111 is charged. As a result, transistor 112 is turned ON, causing transistor 126 to be turned ON, with the result that current flows from line 78 through resistors 134 and 136 to line 82 establishing a voltage at the node between resistors 134, 136 that is sufficient to hold SCR 74 in the conducting state. Thus, if the subscriber is utilizing dial pulse dialing, where TIP and RING are intermittently coupled and decoupled for approximately 10 millisecond periods, transistors 112, 126 allow a voltage to be continually applied to the gate for SCR 74, keeping said SCR conducting.

The second occasion for coupling TIP-in to TIP-out, is when the ringer detection circuit of FIG. 2 detects an appropriate ringer signal on the telephone line and TIP-in and TIP-out must be coupled together to permit the alerting mechanism of the subscriber's equipment to be energized.

As described above, when an appropriate alerting signal is detected by the ringer detection circuit of FIG. 2, line 64 is coupled to line 66 by optoisolator 58 of FIG. 2 during the periods when the ringer signal is applied to the circuit. Simultaneously, rectifying means 76 converts the alerting signal into DC potential which is applied to lines 64, 66 through resistors 92, 148. As a result, on positive-going portions of the ringer signal, a diode 150 conducts to charge capacitor 154. When the voltage across capacitor 154 reaches approximately eight volts, SCR 73 closes and couples TIP-in to TIP-out. The ringer signal will then be received by the alerting mechanism of the subscriber's equipment.

When SCR 73 closes, capacitor 111 is charged. As in the case of SCR 74, a sufficient voltage on capacitor 111 causes transistor 112 to conduct, thus making transistor 126 conducting. With transistor 126 conducting, current passes through line 78 and resistors 134, 136; and the voltage at the node between these resistors causes SCR 74 to close and remain closed throughout the ringing. If the phone is picked up in response to the ringer signal, the voltage on capacitor 111 will keep transistors 112 and 126 conducting so that SCR 74 will be closed during the subsequent conversation or other communication activity.

While capacitor 98 is also charged during application of a ringer signal to rectifying means 76, the ringer signal establishes a voltage at the node between zener diode 144 and resistor 142 which makes FET 102 conducting so as to discharge capacitor 98 through resistor 140 and the FET.

Illustrative values of the resistors, capacitors and zener diodes shown in FIG. 5 are as follows:

| | | | |
|---|---|---|---|
| resistor | 92 | 100K | Ohms |
| resistor | 95 | 120K | Ohms |
| resistor | 106 | 200 | Ohms |
| resistor | 114 | 10 | Ohms |
| resistor | 116 | 220 | Ohms |
| resistor | 122 | 4.7K | Ohms |
| resistor | 134 | 1K | Ohms |
| resistor | 136 | 10K | Ohms |
| resistor | 140 | 100 | Ohms |
| resistor | 142 | 100K | Ohms |
| resistor | 146 | 100K | Ohms |
| resistor | 148 | 4.7K | Ohms |
| resistor | 156 | 10K | Ohms |
| capacitor | 98 | 1 | microFarads |
| capacitor | 110 | 0.01 | microFarads |
| capacitor | 111 | 1000 | microFarads |
| capacitor | 132 | 0.001 | microFarads |
| capacitor | 154 | 0.01 | microFarads |
| zener diode | 83 | 24 | volts |
| zener diode | 144 | 62 | volts |

What is claimed is:

1. An apparatus for selectively alerting subscribers in a party line system having at least three wires comprising:

DC bias detection means for detecting when a signal received by a first line is DC biased in a first direction with respect to both a signal received by a second line and a signal received by a third line, each of said first, second and third lines being coupled to one of said three wires of said party line system, AC signal detection means detecting when an AC signal of predetermined frequency is present on one of said first and second lines, an incoming line being coupled to one of said three wires of the party line system, an outgoing line being coupled to subscriber alerting equipment so as to transmit a subscriber alerting signal to said equipment, and switch means optically isolated from said DC bias detection means and said AC signal detection means for coupling the incoming line to the outgoing line when the DC bias detection means and the AC signal detection means detect the signals specified.

2. The apparatus of claim 1 wherein the DC bias detection means comprises a first FET switch which closes when a signal received by the first line is negatively DC biased with respect to a signal received by the second line and a second FET switch which closes when a signal received by the first line is negatively DC biased with respect to a signal received by the third line.

3. The apparatus of claim 2 wherein the AC detection means comprises a filter for detecting the predetermined AC frequency and rectifying means for rectifying the AC signal.

4. The apparatus of claim 3 further comprising a capacitor which is charged by the rectified AC signal and discharged by the first and second FET switches when they are closed.

5. The apparatus of claim 4 further comprising an optical coupler for closing the switch means when said capacitor is discharged through the FET switches.

6. The apparatus of claim 5 wherein:

the first FET switch means closes when a signal received by the first line is negatively DC biased by at least 36 volts with respect to the second line, the second FET switch means closes when a signal received by the first line is negatively DC biased by at least 36 volts with respect to the third line.

7. An apparatus for selectively alerting subscribers in a party line system comprising:

ringer detection means for detecting when an appropriate ringer signal has been coupled to a party line, an incoming line coupled to a wire of a telephone line on which a ringer signal is transmitted, an outgoing line coupled to subscriber alerting equipment for transmission of said ringer signal to said equipment, first switch means for coupling the incoming line to the outgoing line when the ringer detecting means detects a ringer signal, DC potential detecting means for sensing when DC potential exists across the incoming and outgoing lines; and second switch means for coupling the incoming line to the outgoing line when the DC potential sensing means senses potential across the incoming and outgoing lines and for also coupling the incoming line to the outgoing line after the first switch means has closed.

8. The apparatus of claim 7 wherein the first and second switch means comprise SCRs.

9. The apparatus of claim 8 wherein the second switch means further comprises transistor means for holding the SCR of the second switch means closed after at least one of the first and second switch means closes.

10. The apparatus of claim 7 wherein the ringer detection means comprises DC bias detection means for detecting a predetermined DC component of the ringer signal and AC signal detection means for detecting an AC signal of a predetermined frequency.

11. An apparatus for selectively alerting subscribers in a party line system having at least three wires comprising:
   first switch means for closing when the DC component of a signal received by a first of said three wires biases a second wire to a predetermined polarity and at least to a predetermined voltage relative to said first wire,
   second switch means for closing when the DC component of the signal received by the first wire biases a third wire a predetermined polarity and at least a predetermined voltage relative to said first wire,
   optoisolator means having a first input coupled to a first terminal of one of the switch means and a first output coupled to a first terminal of the other switch means such that when the two switch means are closed current can flow through the switch means and the optoisolator means, whereupon a second input and a second output of the optoisolator are coupled together,
   diode bridge means being coupled to the first and second wires for outputting a first rectified DC potential when a signal having a predetermined AC component is applied across said first and second lines,
   capacitor means coupled to the diode bridge means such that the capacitor means is charged by the first rectified DC potential, said capacitor means also being coupled between second terminals of said first and second switch means so that said capacitor is discharged when said first and second switch means are closed,
   an incoming wire coupled to one of the TIP and RING lines of a telephone wire and an outgoing wire, coupled to the corresponding TIP or RING input of subscriber alerting equipment,
   full wave rectifying means having a first terminal coupled to the incoming wire and a second terminal coupled to the outgoing wire and having third and fourth terminals in a signal flow path between said first and second terminals,
   first SCR means having a first terminal coupled to one of the third and fourth terminals of the full-wave rectifying means, a second terminal coupled to the other of the third and fourth terminals of the full-wave rectifying means, and a gate terminal coupled to the second output of the optoisolator means for closing the first SCR when the optoisolator means couples together the second input and output lines of the optoisolator means,
   detecting means for detecting when the first SCR means closes, and
   second SCR means having a first terminal coupled one of the third and fourth terminals of the full wave rectifying means and a second terminal coupled to the second terminal of the first SCR switch means and a gate terminal for closing when a predetermined potential is coupled across the first and second terminals of the full wave rectifying means and for closing when the detecting means detects that the first SCR has closed.

12. An apparatus for selectively alerting subscribers in a party line system having at least three wires comprising:
   DC bias detection means for detecting when a signal received by a first line is DC biased in a first direction with respect to both a signal received by a second line and a signal received by a third line, each of said first, second and third lines being coupled to one of said three wires of said party line system, said DC bias detection means comprising a first FET switch which closes when a signal received by the first line is DC biased in said first direction with respect to a signal received by the second line and a second FET switch which closes when a signal received by the first line is DC biased in said first direction with respect to a signal received by the third line,
   AC signal detection means detecting when an AC signal of predetermined frequency is present on one of said first and second lines, said AC detection means comprising a filter for detecting the predetermined AC frequency and rectifying means for rectifying the AC signal,
   a capacitor which is charged by the rectified AC signal and discharged by the first and second FET switches when they are closed,
   an incoming line being coupled to one of said three wires of the party line system,
   an outgoing line being coupled to subscriber alerting equipment, and
   switch means for coupling the incoming line to the outgoing line when the DC bias detection means and the AC signal detection means detect the signals specified.

13. The apparatus of claim 12 further comprising an optical coupler for closing the switch means when said capacitor is discharged through the FET switches.

14. The apparatus of claim 13 wherein:
   the first FET switch means closes when a signal received by the first line is negatively DC biased by at least 36 volts with respect to the second line,
   the second FET switch means closes when a signal received by the first line is negatively DC biased by at least 36 volts with respect to the third line.

15. An apparatus for selectively alerting subscribers in a party line system comprising:
   ringer detection means for detecting when an appropriate ringer signal has been coupled to a party line,
   an incoming line coupled to one wire of a telephone line,
   an outgoing line coupled to subscriber alerting equipment,
   a first SCR for coupling the incoming line to the outgoing line when the ringer detecting means detects a ringer signal,
   DC potential detecting means for sensing when DC potential exists across the incoming and outgoing lines; and
   a second SCR for coupling the incoming line to the outgoing line when the DC potential sensing means senses potential across the incoming and outgoing lines and for also coupling the incoming line to the outgoing line after the first switch means has closed.

16. The apparatus of claim 15 wherein the second switch means further comprises transistor means for holding the SCR of the second switch means closed after at least one of the first and second switch means closes.

17. The apparatus of claim 15 wherein the ringer detection means comprises DC bias detection means for detecting a predetermined DC component of the ringer signal and AC signal detection means for detecting an AC signal of a predetermined frequency.

* * * * *